April 16, 1929.  J. E. JOHNSON  1,709,077
MAILING MACHINE
Filed April 3, 1924   8 Sheets-Sheet 5

April 16, 1929.  J. E. JOHNSON  1,709,077
MAILING MACHINE
Filed April 3, 1924  8 Sheets-Sheet 7

Witness:
C. E. Swanson

Inventor:
John E. Johnson.
By: Jones, Addington, Ames, & Seibold
Attys.

Patented Apr. 16, 1929.

1,709,077

UNITED STATES PATENT OFFICE.

JOHN E. JOHNSON, OF CHICAGO, ILLINOIS, ASSIGNOR TO SPEEDAUMAT MANUFACTURING COMPANY, OF CHICAGO, ILLINOIS, A CORPORATION OF DELAWARE.

MAILING MACHINE.

Application filed April 3, 1924. Serial No. 703,949.

This invention relates to machines designed to address periodicals or books for mailing purposes and to also perform certain operations in connection with the assorting and wrapping of such addressed articles.

Various forms of machines for individually addressing articles to be mailed are well known in the art. One form of such machines makes use of address plates, each of which bears an address for one of the articles to be mailed, these plates being successively fed through a guideway, and the address impressions being taken at some point along the guideway. The articles to be mailed may follow another guideway in proximity of the address plate guideway. In the practical use of such devices, it has been found that many of the addressed articles may be mailed in groups, whereas others of the articles must be individually wrapped and mailed. For example, if many of the articles, such as copies of magazines, are to be mailed to one city, all of such articles destined to that city may be preferably wrapped and mailed in a group, whereas if the addresses are scattered, then individual wrapping is necessary.

One object of the present invention, therefore, is to provide in a machine of the character above described, means whereby articles which are to be addressed and individually wrapped or mailed may be separated or selected from the articles which are to be mailed in a group. It will be understood that the selective mechanism herein described and embodying this invention may also be used to separate articles having classification characteristics other than the particular example above stated. The use of the invention in selecting articles that are to be individually wrapped from those mailed in groups, is here cited merely as illustrative of the uses of the invention.

A further object of this invention is to provide in a machine of this character a plurality of discharge paths for the addressed articles, and selective means for determining the discharge path to be followed by each article in accordance with predetermined characteristics of the address printed thereon.

A further object of this invention is to provide mechanism for cutting wrapper paper into lengths and for feeding such lengths to one or more of the discharge paths, one of such lengths of wrapper paper to accompany each of the articles that is fed through the particular discharge path with which the mechanism is associated.

A further object of this invention is to provide means controlled by the printing plates that follow the printing plate guideway of an addressing machine for determining the selected classification to be assigned to each article or book that passes through the addressing machine.

Further objects of this invention comprise the provision of comparatively simple and reliable mechanism for the purposes named. Other objects accomplished by this invention will be readily understood from the following disclosure and claims.

In the accompanying drawings, which illustrate an embodiment of my invention—

Fig. 13 is a schematic view illustrating the relative position of several of the important working parts of the machine embodying my invention; and, Fig. 14 is a detail cross sectional view through the wrapper paper cutting mechanism.

Figure 1:
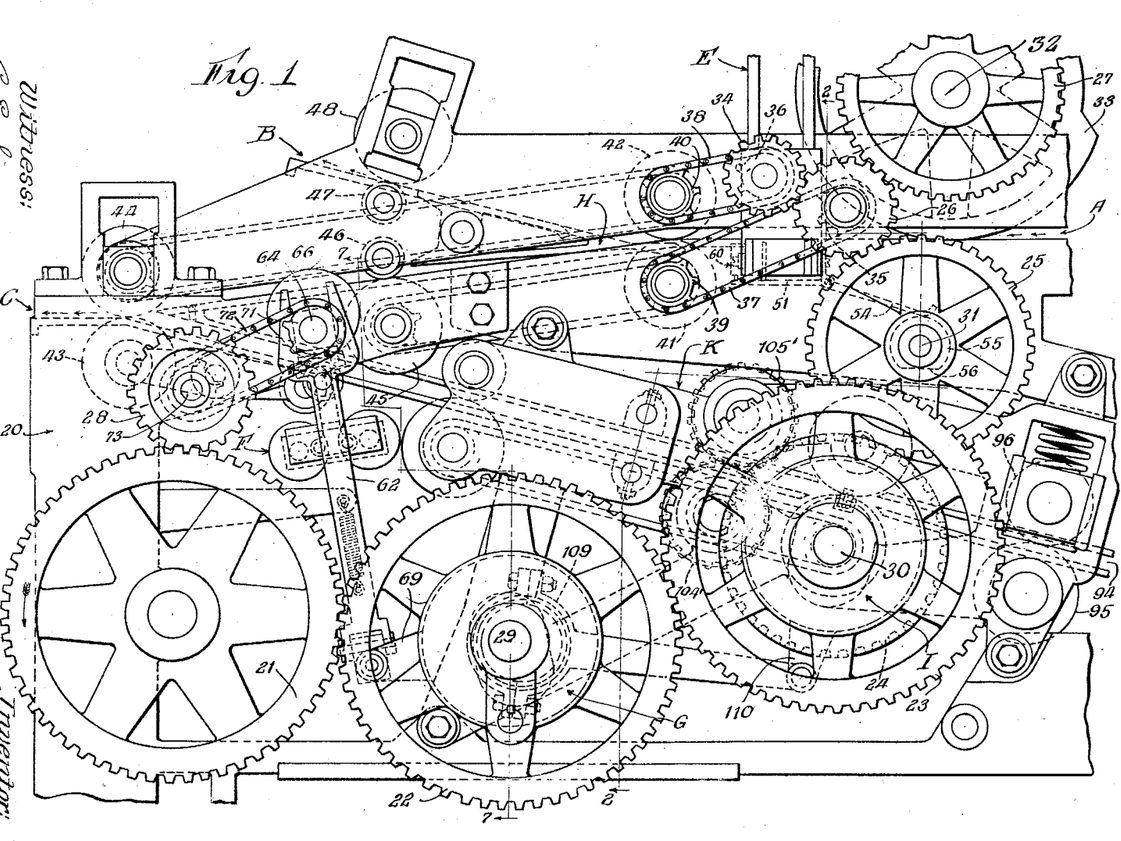
Figure 1 is a side elevational view of a portion of a mailing machine embodying the invention.

In general, the machine as illustrated in Fig. 1 may comprise a "book" or article guideway —A— through which the articles to be addressed enter in the direction of the arrows. From the guideway —A— the articles, after having been addressed, are selectively discharged through a plurality of discharge paths as at —B— and —C—.

The articles to be addressed upon entering the machine pass over an address plate guideway —D— which may be of the type shown in my copending application, Serial No. 617,793, filed February 8, 1923, or any other suitable or similar form of mechanism. A series of address plates which may be kept in a rack as at —E— successively pass through the address plate guideway and each of these address plates serves to imprint an address upon the corresponding book or article which is at the time passing through the guideway —A—.

Figure 4:
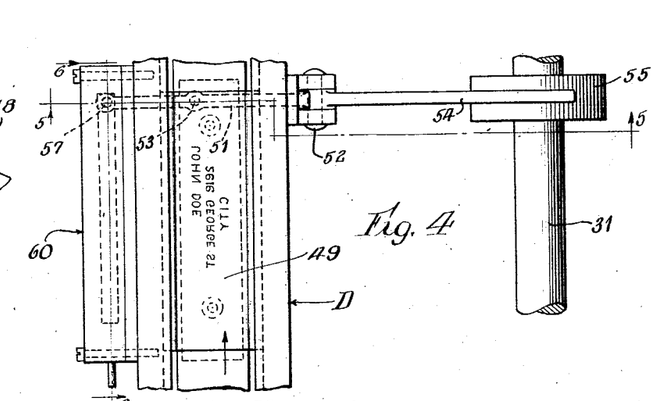
Fig. 4 is a plan view illustrating a portion of the address plate guideway and the electrical switching mechanism accompanying this guideway.
Figures 5, 6:
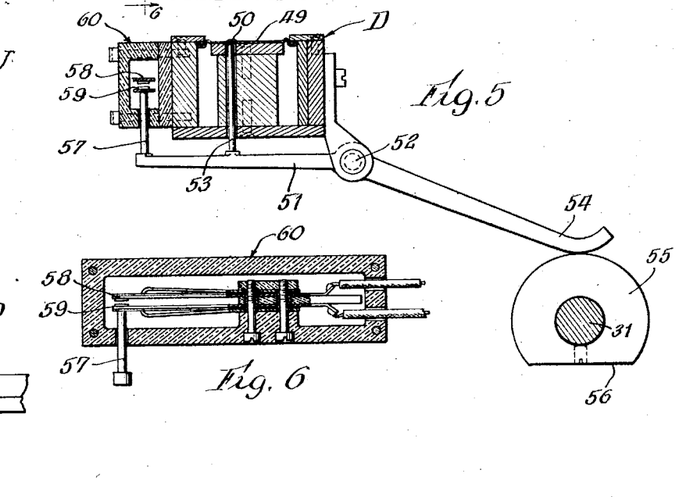
Fig. 5 is a sectional view taken on line 5—5 of Fig. 4.
Fig. 6 is a sectional view taken on line 6—6 of Fig. 4.

Each address plate may carry in addition to the address embossed thereon, certain other distinguishing characteristics for the purpose of subsequently classifying the articles addressed. These distinguishing characteristics may take the form of bosses or other deformations whereby switching mechanism, such as shown in Figs. 4, 5 and 6, may be actuated at appropriate times. This switching mechanism may serve to control an electric circuit including electromagnets as at —F—. The electromagnets —F— may serve in turn to control a clutch mechanism as at —G— which controls the actuation of the selecting device per se at —H—, the actuation of which determines which of the discharge paths will be traversed by each individual book that has been addressed.

Figure 2:
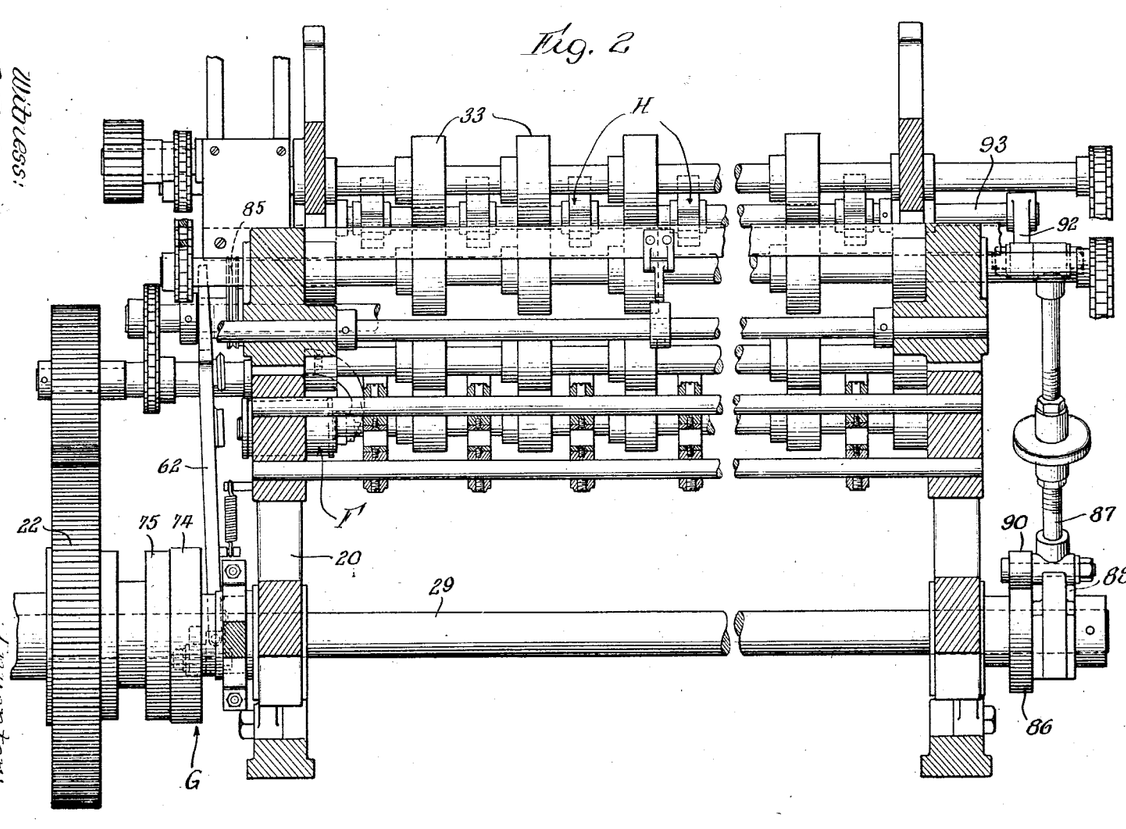
Fig. 2 is a sectional view taken on line 2—2 of Fig. 1, and showing various operating parts of this embodiment of my invention.
Figure 3:
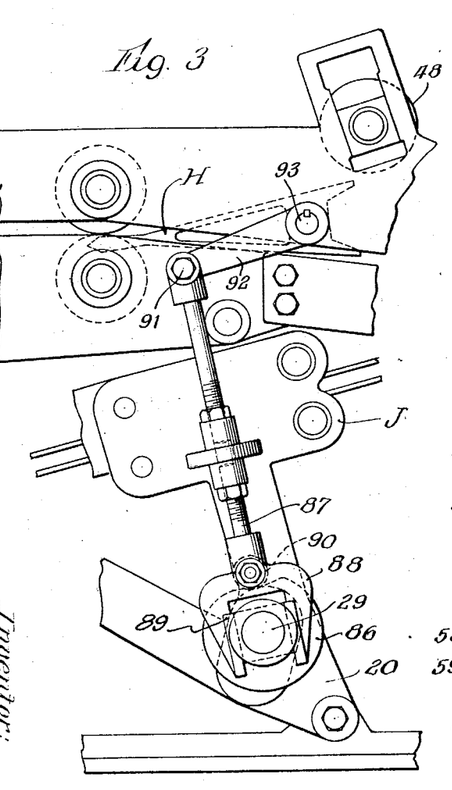
Fig. 3 is a view showing in detail the portion of the mechanism for directly operating the selector means in the machine.

The selective device —H— as shown in Figs. 1, 2 and 3 may take the form of a plurality of fingers which when in their depressed position serve to deflect the addressed articles into the discharge path —B—. When the selective fingers are elevated the addressed articles may continue on through the discharge path —C—.

The electromagnetically controlled clutch —G— also may serve to control a clutch mechanism —I—, which in turn serves to actuate wrapper paper cutting and forwarding mechanism at —J— and —K—, respectively.

The various elements of the machine may be mounted upon a suitable frame-work 20 as illustrated in Fig. 1. Power from any suitable source may be applied to a drive gear 21, which serves to constantly rotate a series of drive gears 22 through 27 inclusive, and a drive gear 28. The gear 22 is rotatably mounted upon a shaft 29 and may be coupled thereto upon actuation of the electromagnetic selector mechanism hereinafter described. When the gear 22 is thus coupled to the shaft 29 through the medium of the clutch —G—, the selector device —H— is operated.

The gear 23 which meshes with gear 22 is rotatable upon a shaft 30 and may be coupled thereto through the clutch mechanism —I—. When the clutch mechanism —I— is in engagement, the shaft 30 will rotate thus actuating the cutting mechanism —J— and wrapper feed mechanism —K—. The gear 24 is attached to and constantly rotates with the gear 23.

The gear 24 meshes with the gear 25 which in turn is fixed upon shaft 31. The shaft 31 performs certain functions which will hereinafter be described in connection with the actuation of the switch mechanism at the address plate guideway. The gear 25 meshes with the gear 26 which in turn meshes with the gear 27 fixed upon a shaft 32. The shaft 32 thus is constantly rotated and serves to rotate a suitable feeding roller 33, which feeds the articles or books into the guideway —A—.

The gear 26 also engages a gear 34. Associated with the gears 26 and 34 are sprockets 35 and 36, respectively, which serve to drive flexible chains 37 and 38 respectively. The chains 37 and 38 engage sprockets 39 and 40, respectively, which serve to rotate additional feed rollers 41 and 42. Associated with the sprockets 39 and 40 are additional sprockets and chains for rotating feed rollers 43 and 44, respectively, at the mouth of the discharge path —C—. Another feed roller 45 may be placed intermediate between the rollers 41 and 43 and may be driven by a suitable sprocket and chain arrangement similar to those above mentioned. The feed roller 45 may be placed below the path of travel of the books traversing the discharge path —C—. This roller may cooperate with an idler feed roller 46 placed above the discharge path. The discharge path —B— may be provided with suitable feed rollers as indicated at 47 and 48.

The switch mechanism at the address plate guideway —D— for actuating the electromagnets —F— will now be described in detail. A group of sheet metal address plates, such as shown at 49, may be stacked in the rack —E— from which they may be automatically fed into the guideway —D— by any suitable mechanism, such as described in my copending application, above referred to. Address plates bearing addresses belonging to certain predetermined group classifications may be provided with an up-set boss as at 50 (see Fig. 5). When the address is imprinted upon an article from an address plate bearing one of these bosses, the addressed article through the medium of the mechanism about to be described, will be discharged through the discharge path —C—, whereas articles or books which are addressed from address plates not carrying these bosses will be subsequently discharged through the discharge path —B—.

The switch operating mechanism, as shown particularly in Fig. 5, comprises a bell crank 51 pivotally mounted at 52 and bearing a needle or pin 53 upon one of its arms. The other arm of the bell crank at 54 rests against a cam 55 which constantly rotates with shaft 31, previously referred to. The larger part of the cam 55 is of a radius sufficient to hold the arm 54 in a position whereby the needle or pin 53 is held out of contact at its upper end with the address plates 49. However, the cam 55 is provided with a flattened portion 56. When the arm 54 engages this flattened portion the bell crank, because of the weight of the arm 54, will have a tendency to force the needle 53 up against the address plate 49. If at this time the particular address plate positioned over the needle is provided with a boss as at 50, the needle will be permitted to rise a slight amount into this boss. The cam 55 may, of course, be rotated with the proper speed and may be so adjusted upon its shaft that the flattened portion 56 will engage the arm 54 at only such times as an address plate is in the position shown directly over the needle in the guideway. As the needle rises into an address plate boss 50, a switch operating pin 57 upon the bell crank, is also raised sufficiently to cause a circuit to be completed between contacts 58 and 59 in a switch 60. This action will be only momentary, however, since the cam 55 continuously rotates and as soon as the flattened portion 56 leaves the arm 54, the needle 53, as well as the switch operating pin 57, will drop down again thus permitting the switch to open. This momentary closing of the switch, however, is sufficient to cause actuation of the selector mechanism.

The switch 60 may be placed in series with any suitable source of power and with the electromagnets —F—.

Figure 7:
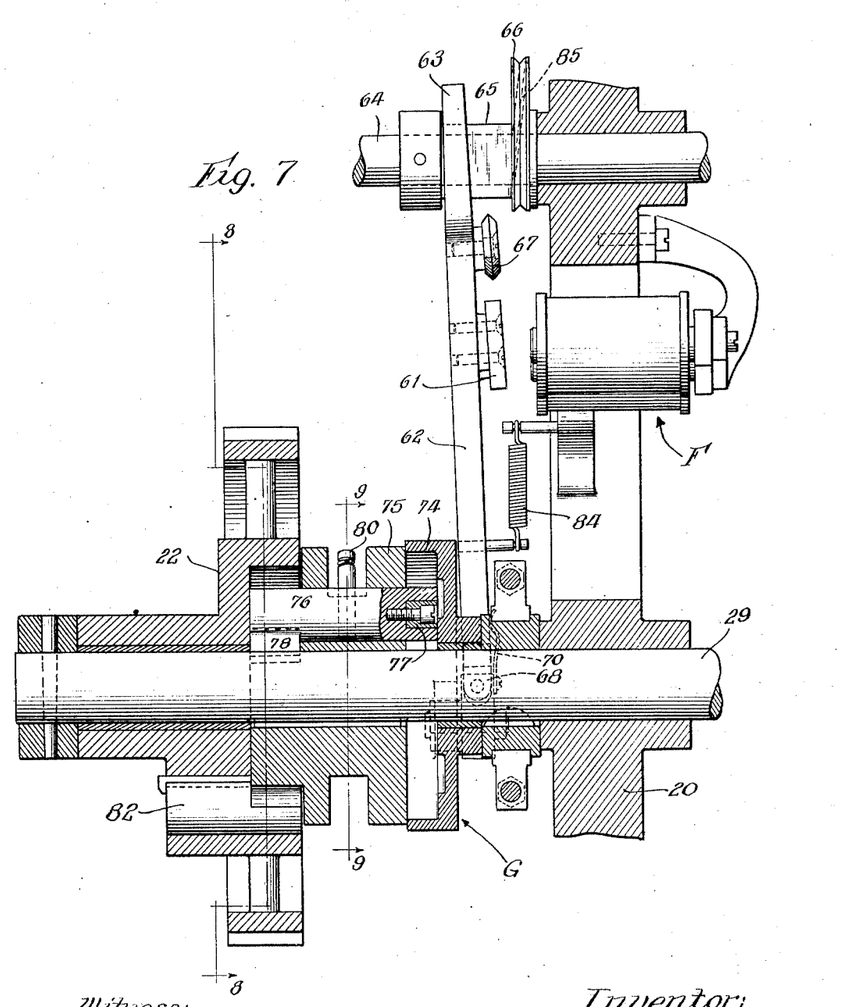
Fig. 7 is a sectional view taken on line 7—7 of Fig. 1, and illustrating partly in section, an electromagnetically operated clutch mechanism which controls the selector device of the machine.
Figure 8:
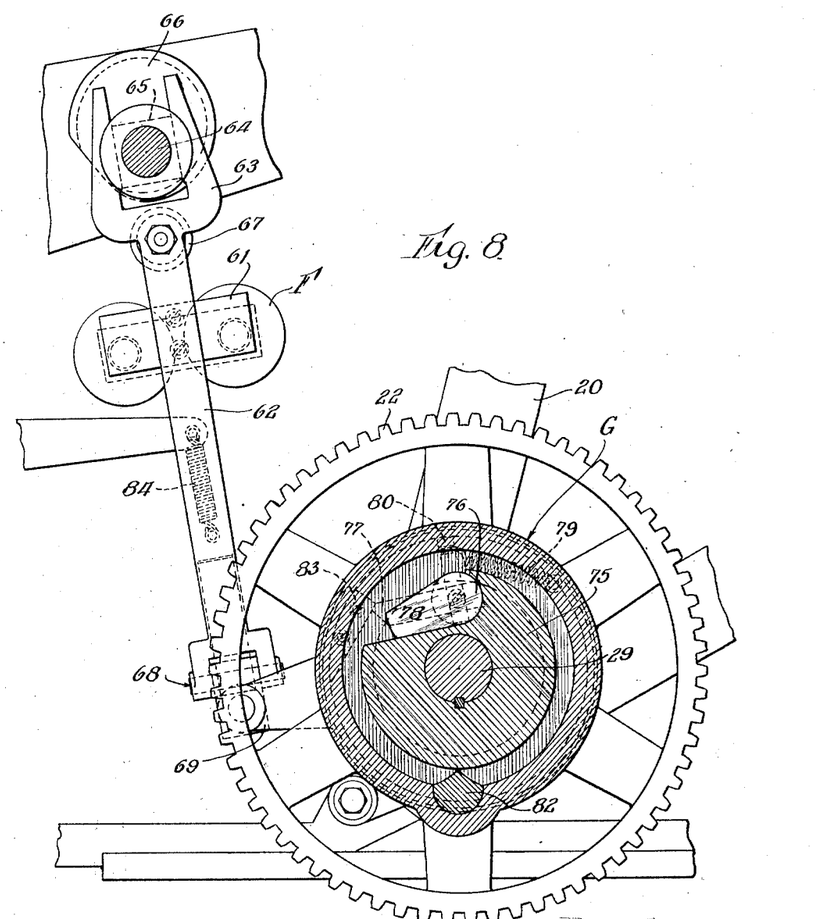
Fig. 8 is a side elevational view partly in section of the mechanism shown in Fig. 7.

Attention is now directed particularly to Figs. 7 and 8. The electromagnets —F— when actuated by the closing of the switch 60 will attract an armature 61, which armature is mounted upon a lever 62. The lever 62 is provided with a forked upper end 63 which straddles a shaft 64 and embraces a squared bearing shoe 65 rotatably mounted upon the shaft. A grooved eccentric cam 66 is fixed upon the shaft 64. A roller 67 is mounted upon the lever 62 for engaging the groove cam 66 when the electromagnets —F— are actuated. The lever 62 at its lower end is provided with a universal joint 68 for attachment to a clutch operating lever 69. A leaf spring 70 at the universal joint normally holds the lever 62 at a position where the roller 67 will be out of engagement with the cam 66. However, the electromagnets —F— when actuated possess sufficient strength to draw the lever 62 against the force of spring 70 into a position where the roller 67 will be engaged by the cam 66. The shaft 64 may be constantly rotated by a sprocket 71 and chain 72, which extends around a sprocket upon a shaft 73, the shaft 73 being rotated by the gear 28 (see Fig. 1). The cam 66 being fixed upon the shaft 64 will also continuously rotate and as its part of greater radius turns to a point beneath the shaft, the roller 67 will be forced downwardly, thus also forcing the lever 62 downwardly together with the clutch operating lever 69.

Figure 9:
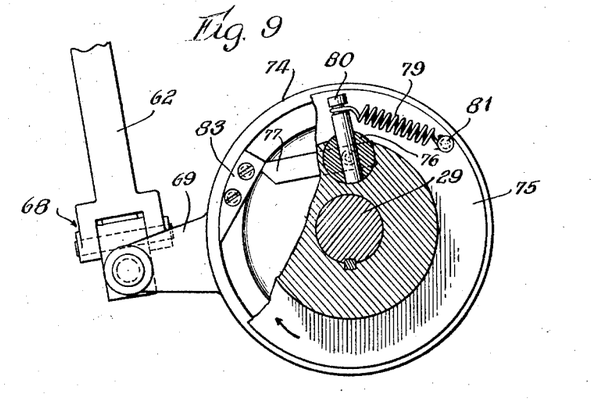
Fig. 9 is a front view of certain details of a portion of the clutch mechanism shown in Fig. 8.
Figure 10:
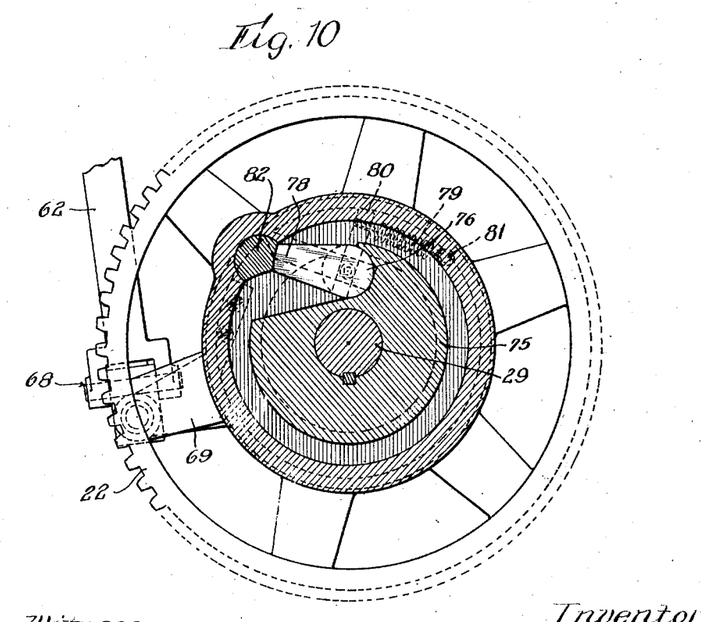
Fig. 10 is a view similar to Fig. 9, but illustrating additional parts of the clutch mechanism.

This downward movement of the lever or crank 69 has the effect of actuating the clutch —G—, which will now be described and the purpose of which is to actuate the selector member —H—. As shown in Fig. 7, the gear 22 is rotatably mounted upon the shaft 29 and the specific purpose of the clutch mechanism —G— is to connect the shaft 29 to the gear 22 so that the shaft will be rotated with the gear. The clutch operating lever 69 may be integrally formed with a clutch housing member 74, (see Figs. 9 and 10) which is rotatably mounted upon shaft 29. A clutch body member 75 is also mounted upon the shaft 29, but is keyed thereto. A pin or stub shaft 76 extends through the member 75 and is provided at one end with a dog member 77 and at its other end with a dog member 78. The shaft 76 is normally retained in an angular position such that the outer ends of the dog members occupy an extreme position at the periphery of the member 75 as indicated in Fig. 10. A spring 79 attached to a pin 80 that extends radially of the shaft 76 tends to hold the shaft in this extreme angular position. The spring 79 is fastened at 81 to the member 75. The hub of the gear 22 is provided with an insert piece 82 for engagement with the dog 78. This engagement will be effected only when the shaft 76 and its accompanying dogs are in the above described extreme angular position, as shown in Fig. 10. At such times the shaft 29 will be locked for rotation with the gear 22. However, as soon as the shaft 29 is given nearly one complete revolution, the dog member 77 will strike against a block 83 fixed upon the interior of the cam housing 74 (see Fig. 9). As the dog member 77 slides over the inner face of the block 83, the dog will be forced inwardly sufficiently to change the angular position of the shaft 76 from that as shown in Fig. 10 to the position shown in Fig. 8. This will result in forcing the dog 78 inwardly sufficiently to allow the insert member 82 to pass. Thereupon the clutch mechanism will be disengaged and the shaft 29 will no longer rotate with the gear 22. However, as soon as the electromagnets are again actuated and the levers 62 and 69 are thrust downwardly by the action of the cam 66, then the block member 83 will also be turned downwardly as viewed in Fig. 9, sufficiently to allow the dog member 77 to slip upwardly. This will permit the shaft 76 to turn into the position shown in Fig. 10 by reason of the force exerted by spring 79. The clutch will then assume the engaged condition shown in Fig. 10.

Referring again to Fig. 7 and the cam 66, it will be observed that as soon as the part of this cam which is of greatest radius is turned upwardly, then the lever 62 will also again assume its upper position as shown in Fig. 7 by reason of the force exerted by a spring 84. At the same time the wheel or roller 67 will be forced out from the groove of the cam 66, since this groove is helical in form, as shown by dotted lines at 85. The spring 70 may then throw the lever 62 into the inactive position as shown in Fig. 7.

The above describes the mechanism for rotating the shaft 29 upon the actuation of the switch 60 and the consequent energization of the magnets —F—. In Fig. 3, mechanism is shown upon the end of shaft 29 at the opposite side of the machine from that illustrated in Fig. 1. This mechanism comprises the means for directly actuating the selecting member —H—, at such times as the shaft 29 is rotated. This mechanism is further shown at the right hand side of Fig. 2. Upon the shaft 29, a cam 86 is fixed. A reciprocating connecting rod 87 of adjustable length is provided with a forked lower end 88 which straddles the shaft 29 and embraces a squared bearing shoe 89. A roller 90 mounted upon the rod 87 engages the surfaces of the cam 86. The upper end of the connecting rod 87 is pivotally attached at 91 to a lever 92, which is for the purpose of oscillating a shaft 93 upon which the selector device —H— is pivotally supported.

Accordingly, when the shaft 29 is rotated the action of the cam 86 upon the roller 90 will cause the connecting rod 87 to be raised. Thereupon the selector device —H— will also be raised.

It will now be seen that when an address plate having a boss as at 50 properly placed thereon to indicate a predetermined group classification, traverses the address plate guideway, that such an address plate will first cause a closing of the circuit through the switch 60. The closing of this circuit results in energizing the magnets —F—. The magnets —F— in turn operate the clutch —G—, causing rotation of the shaft 29. The shaft 29 thus rotates the cam 86 through one revolution which action by reason of the actuating rod 87 causes the selector device —H— to be momentarily raised. Such actuation of the selector device —H— will cause the addressed article passing through the guideway 9 to be deflected downwardly into the discharge path —C—.

The mechanism —J— for cutting the wrapper into lengths and the wrapper paper advancing mechanism —K— will now be described. The wrapper paper in continuous sheets may enter the machine at 94 between suitable feed rollers 95 and 96. Guided by members 97 and 98, the wrapper paper may pass between cutting rollers 99 and 100. One of the rollers as 99 may be provided with a knife 101 for cutting the paper into appropriate lengths. The cutting roller 99 may be mounted upon or be driven by the shaft 30. The cooperating roller 100 may be frictionally driven or may be driven by any suitable positive drive mechanism. From the cutting rollers the paper in wrapper lengths may pass between feed rollers as at 102 and 103, driven by suitable gears 104' and 105', respectively, which in turn are driven from the gear 23. The cut-off lengths of wrapper paper then pass between suitable guides and additional feed rollers to advancing rollers 104 and 105.

Figures 13, 14:
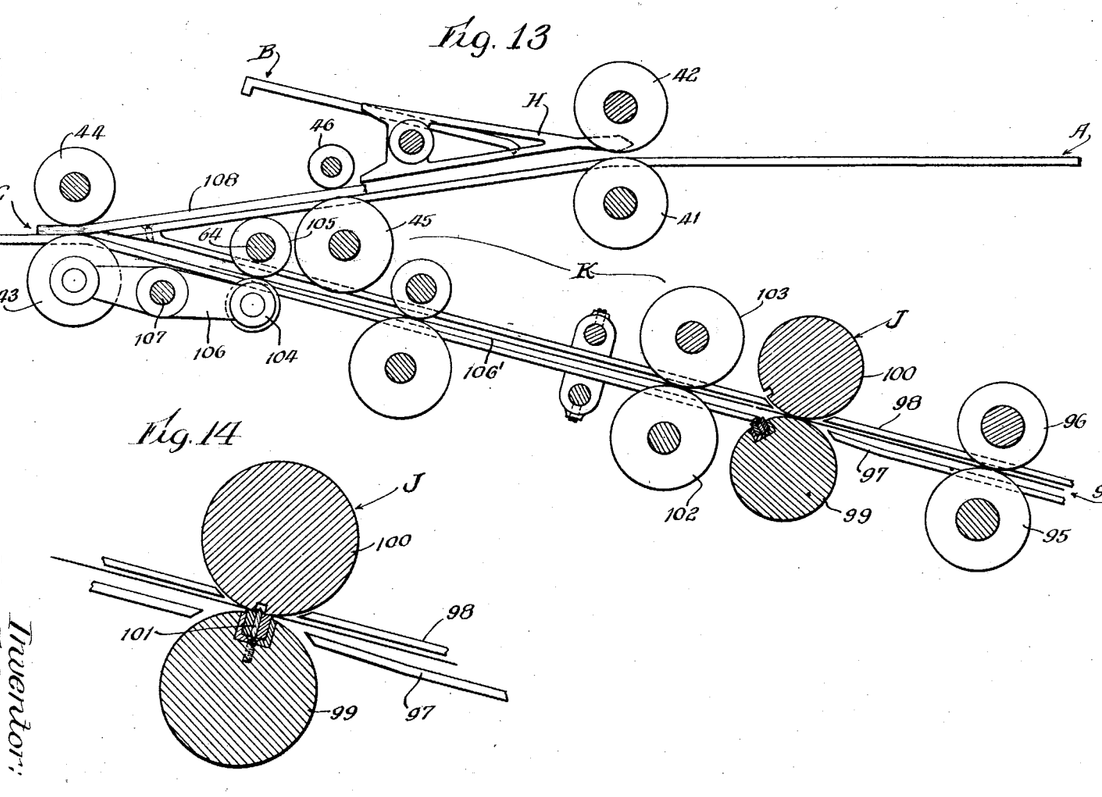

When the wrapper cutting and advancing mechanism is not being actuated, a sheet of wrapping paper as at 106' (see Fig. 13) normally rests with its upper edge extending beneath the roller 105. At such times the roller 104 is out of contact with the roller 105. The roller 105 may be mounted upon shaft 64 and accordingly may be constantly rotated. However, its rotation is not effective upon the wrapper paper until the roller 104 is pressed firmly into contact therewith. The rollers 104 and 43 may be mounted upon opposite ends of a bracket member 106, which is pivoted at 107. Normally while no articles or books are being discharged from the path —C—, the roller 43 is held up in contact with roller 44 by the weight of roller 104. However, at such times as a book 108 is passing through the discharge path —C—, the rollers 43 and 44 will be separated. This separation causes the roller 104 to be elevated into firm contact with the roller 105, except for the intervening sheet of wrapping paper which thereupon is advanced and out of the discharge paths —C— with the book 108.

Figure 11:
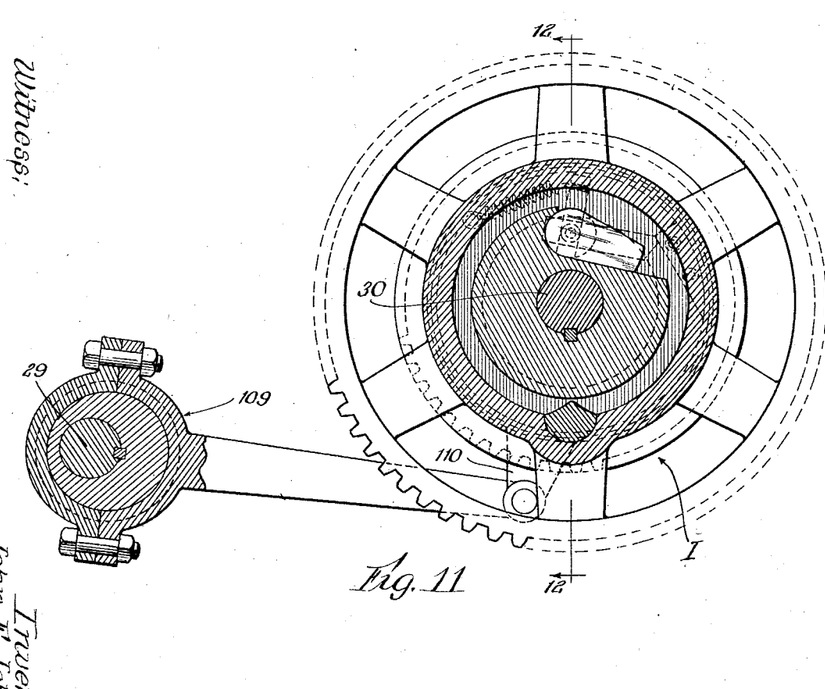
Fig. 11 is a side elevational view, partly in section of an additional clutch mechanism similar to the clutch mechanism of Fig. 8, but serving to control the operation of the wrapper paper cutting and feeding devices.
Figure 12:
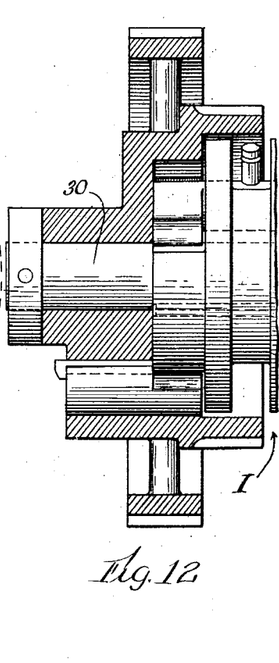
Fig. 12 is a sectional view taken upon line 12—12 of Fig. 11.

It will thus be seen that lengths of wrapper paper are advanced only at such times as a book is actually passing out of the discharge path —C—. Accordingly, when the books are being discharged through the discharge path —B— no wrapper paper will be advanced out of the discharge path —C—. Furthermore, in view of certain mechanism about to be described, the wrapper paper is cut into lengths only when a book is selected and discharged through the discharge path —C—. The feed rollers 102 and 103 are driven by intermeshing gears 104′ and 105′, respectively. The gear 104 may be driven through suitable sprocket and chain mechanism from the shaft 30 as indicated by dotted lines in Fig. 1. The cutting rollers 99 and 100 and the feed rollers 102 and 103 are rotated by the shaft 30 only at such times as the shaft 30 is locked by the clutch —I— to the constantly driven gear 23. The clutch —I— is illustrated in detail in Figs. 11 and 12 and is of a construction similar to the clutch —G— except that rotation is effected in the opposite direction. When the shaft 29 is rotated, an eccentric 109 is also actuated and serves to move a clutch operating crank or lever 110 to the left in Fig. 11. The crank 110 corresponds to the operating crank 69 of the clutch mechanism —G— and this movement of the crank to the left serves to place the clutch —I— in locked condition. As the shaft 29 completes a single revolution, the crank 110 is restored to its former position and the clutch —I— becomes unlocked again. Meanwhile the cutting rollers and the associated feed rollers are given one complete revolution. This operation, of course, takes place only when the clutch mechanism —G— is operated in response to the actuation of the electromagnetic selector mechanism.

While I have shown and described one particular embodiment of my invention, it is understood that I do not desire to have any limitations imposed thereupon except as specifically set forth in the appended claims or required by the prior art, since many expedients or equivalents of the various elements are intended to come within the scope of my invention.

Having thus described my invention, what I claim as new and desire to secure by Letters Patent of the United States, is:

1. In an addressing machine, a guideway for a series of articles to be addressed, address printing means along said guideway, a plurality of discharge paths for the articles, and selective means for determining the discharge path to be followed by each article and supplying wrappers to certain of the articles in accordance with predetermined characteristics of the address to be printed thereon.

2. In a printing machine, a book guideway having a plurality of discharge paths therefrom, a printing plate guideway, and mechanism actuated by the successive printing plates that follow said printing plate guideway for determining the discharge path to be followed by each book that follows said book guideway and for supplying wrappers to certain of the books.

3. In an addressing machine, a book guideway for a series of articles to be addressed, a printing plate guideway for guiding printing plates bearing addresses to be imprinted upon said articles, means at the discharge end of said book guideway for upwardly deflecting from said book guideway all articles upon which addresses of predetermined characteristics have been printed by the printing plates, and mechanism controlled by the successive printing plates that follow said printing plate guideway for actuating said deflecting means and for supplying wrappers to the articles not deflected upwardly.

4. In a printing machine, a book guideway having a plurality of discharge paths therefrom, a printing plate guideway, and mechanism including an electric circuit controlled by the successive printing plates that follow said printing plate guideway for determining the discharge path to be followed by each book that follows said book guideway and for feeding individual wrappers to books following one of said paths.

5. In a machine of the class described, a book guideway having at least two discharge paths therefrom, mechanism for cutting wrapper paper into lengths and for advancing individual wrappers to one of said discharge paths only as a book is discharged therefrom, another of said paths serving to accommodate books to be mailed or wrapped in groups, a printing plate guideway, and mechanism actuated by the successive printing plates that follow said printing plate guideway for determining the discharge path to be followed by each book in accordance with predetermined characteristics of the address to be printed on the book by its corresponding printing plate.

6. In a machine of the class described, a book guideway having at least two discharge paths therefrom, mechanism for advancing individual wrappers to one of said discharge paths only as a book is discharged therefrom, another of said paths serving to accommodate books to be mailed or wrapped in groups, a printing plate guideway, and mechanism actuated by the successive printing plates that follow said printing plate guideway for determining the discharge path to be followed by each book in accordance with predetermined characteristics of the address to be printed on the book by its corresponding printing plate.

7. In an addressing machine, a guideway for a series of articles to be addressed, address printing means along said guideway, means for advancing individual wrappers from beneath said guideway to the discharge end thereof but only as an article is discharged therefrom, means near the discharge end of said guideway for upwardly deflecting from said guideway all articles upon which addresses classifiable in predetermined groups have been printed by said printing means, and mechanism actuated by said printing means for controlling the wrapper advancing means and the deflecting means.

8. In an addressing machine, a guideway for a series of articles to be addressed, address printing means along said guideway, means for advancing individual wrappers to the discharge end of said guideway but only as an article is discharged therefrom, means near the discharge end of said guideway and controlled by the address printing means for deflecting from said guideway all articles upon which addresses classifiable in predetermined groups have been printed by said printing means, and mechanism actuated by said printing means for controlling the wrapper advancing means and the deflecting means.

9. In an addressing machine, a book guideway having at least two discharge paths therefrom, mechanism for advancing individual wrappers to one of said paths as a book is discharged therefrom, another of said paths serving to accommodate books to be mailed or wrapped in groups, a deflector for guiding the books to said discharge paths, a printing plate guideway, and electromagnetically operated clutch mechanism actuated by printing plates that follow said printing plate guideway for controlling the deflector whereby the discharge path to be followed by each book is determined in accordance with predetermined characteristics of the address to be printed on the book by its corresponding printing plate.

10. In a machine of the class described, a book guideway having a discharge path for books that follow along said book guideway, a wrapper guideway, means for feeding a wrapper to each book, said means including a pivoted lever having book and wrapper advancing rollers at its ends, said wrapper advancing roller adapted to remain inoperative to prevent advancing of a wrapper until a book follows along said discharge path and past said book roller.

11. In a machine of the class described, a book guideway having a discharge path for books that follow along said book guideway, a wrapper guideway, means for feeding a wrapper to each book, said means including a pivoted lever having book and wrapper advancing rollers oppositely disposed thereon, said wrapper roller being held in inoperative position until said book advancing roller is engaged by a book to be wrapped.

12. In a machine of the class described, a book guideway having a discharge path for books that follow along said book guideway, a wrapper guideway communicating with said discharge path, means operable by the discharge of a book through said discharge path for advancing a wrapper thereto, and wrapper cutting mechanism for advancing a second wrapper to said means for subsequent operation.

13. In a machine of the class described, a book guideway having a plurality of discharge paths for books that follow along said book guideway, a wrapper guideway communicating with one of said discharge paths, means operable when a book is advancing through said discharge path to advance a wrapper thereto from said wrapper guideway, and substantially simultaneously operable means for cutting and advancing a second wrapper for subsequent operation upon deflection of the book into said discharge path.

14. In an addressing machine the combination comprising a book passageway having a plurality of discharge passages therefrom, addressing means associated with said passageway and comprising a series of individual metal address plates having individual addresses thereon provided by printing characters embossed from the plates, means for printing the addresses from said printing plates on successive books, said plates also being formed to indicate which of the discharge passages the book addressed by a given plate should take, selective means for controlling the discharge passage to be followed by a given book, and control means arranged to engage the faces of the plates opposite the printing face and to be controlled by the discharge indication on the plate for actuating said selective means to direct a book into the passageway indicated by its address plate.

15. In an addressing machine the combination comprising a book passageway having a plurality of discharge passages therefrom, addressing means associated with said passageway and comprising a series of individual metal address plates having individual addresses thereon provided by printing characters embossed from the plates, a guideway for carrying said plates into proximity with said books so that the embossed faces of said plates may print addresses on successive books, said plates being also embossed to indicate the discharge passage which the book should take, selective means for directing a given book into one of said passages, and control means arranged to engage successive plates opposite their printing faces in the region of the discharge-indicating embossing thereon to actuate said selective means to discharge the books into the passageway predetermined by the discharge-indicating embossing on the respective address plates.

16. In an addressing machine the combination comprising a book passageway having a plurality of discharge passages therefrom, addressing means associated with said passageway and comprising a series of individual metal address plates having individual addresses thereon provided by printing characters embossed from the plates, a guideway for carrying said plates into proximity with said books so that the embossed faces of said plates may print addresses on successive books, said plates being also embossed to indicate the discharge passage which the book should take, selective means for directing a given book into one of said passages, and control means arranged to engage successive plates in the region of the discharge-indicating embossing thereon to actuate said selective means to discharge the books into the passageway predetermined by the discharge-indicating embossing on the respective address plates.

In witness whereof, I have hereunto subscribed my name.

JOHN E. JOHNSON.